US009430543B2

(12) United States Patent
Srivastava et al.

(10) Patent No.: US 9,430,543 B2
(45) Date of Patent: Aug. 30, 2016

(54) INCREMENTALLY UPDATING A LARGE KEY-VALUE STORE

(71) Applicant: Wal-Mart Stores, Inc., Bentonville, AR (US)

(72) Inventors: Varun Srivastava, Sunnyvale, CA (US); Yan Zheng, San Jose, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 584 days.

(21) Appl. No.: 13/840,781

(22) Filed: Mar. 15, 2013

(65) Prior Publication Data

US 2014/0279886 A1    Sep. 18, 2014

(51) Int. Cl.
*G06F 7/00*   (2006.01)
*G06F 17/30*   (2006.01)

(52) U.S. Cl.
CPC ..... *G06F 17/30575* (2013.01); *G06F 17/3038* (2013.01); *G06F 17/30345* (2013.01)

(58) Field of Classification Search
CPC ............................................... G06F 17/30345
See application file for complete search history.

(56) References Cited

U.S. PATENT DOCUMENTS

| 6,016,512 | A | * | 1/2000 | Huitema | ........... H04L 29/12066 707/999.1 |
| 6,073,141 | A | * | 6/2000 | Salazar | ............. G06F 17/30575 |
| 6,457,021 | B1 | | 9/2002 | Berkowitz | |
| 7,240,054 | B2 | | 7/2007 | Adiba | |
| 7,302,425 | B1 | * | 11/2007 | Bernstein | .......... G06F 17/30457 |
| 7,917,499 | B2 | | 3/2011 | Kleewein | |
| 8,306,959 | B2 | | 11/2012 | Nica | |
| 2005/0267914 | A1 | * | 12/2005 | Moore | .............. G06F 17/30377 |
| 2009/0187582 | A1 | | 7/2009 | Chen et al. | |
| 2011/0010344 | A1 | | 1/2011 | Sjoegren | |

OTHER PUBLICATIONS

Giuseppe Decandia et al: "Dynamo: Amazons Highly Available Key-value Store", Proceeding SOSP '07 ACM SOSP. Proceedings of the ACM Symposium on Operating Systems Principles, ACM; US, Oct. 14, 2007, pp. 205-220, XP007912296.

* cited by examiner

*Primary Examiner* — Charles Lu
(74) *Attorney, Agent, or Firm* — Bryan Cave LLP

(57) ABSTRACT

Embodiments of methods, systems, and computer program products for incrementally updating a large key-value store can include a computer-implemented method of updating a master database comprising refreshing a refresh set of oldest entries in the master database, merging an emergency set of entries in an emergency database into the master database, and deleting the emergency set of entries from the emergency database. In some embodiments, the computer-implemented method can further comprise merging a changed set of entries in a changed database into the master database and deleting the changed set of entries from the changed database. Other embodiments of related methods and systems are also provided.

13 Claims, 3 Drawing Sheets

INCREMENTALLY UPDATING A LARGE KEY-VALUE STORE

BACKGROUND

A typical large key-value database store in a production environment may be too large to be regularly updated in an efficient manner according to current methods. One objective of a large key-value store in a production environment is to maintain data "freshness" by updating or deleting old values from the data store.

As an example, a typical large database store in a production environment may have up to 100 million entries or more. Entries might have an average size of, for example, 10 kilobytes each, comprising a total database size of approximately one terabyte. To update all entries at an average rate of 2000 updates per second may take almost 14 hours or more. Accordingly, updating all values in a large key-value store on a daily basis may not be preferable or feasible.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
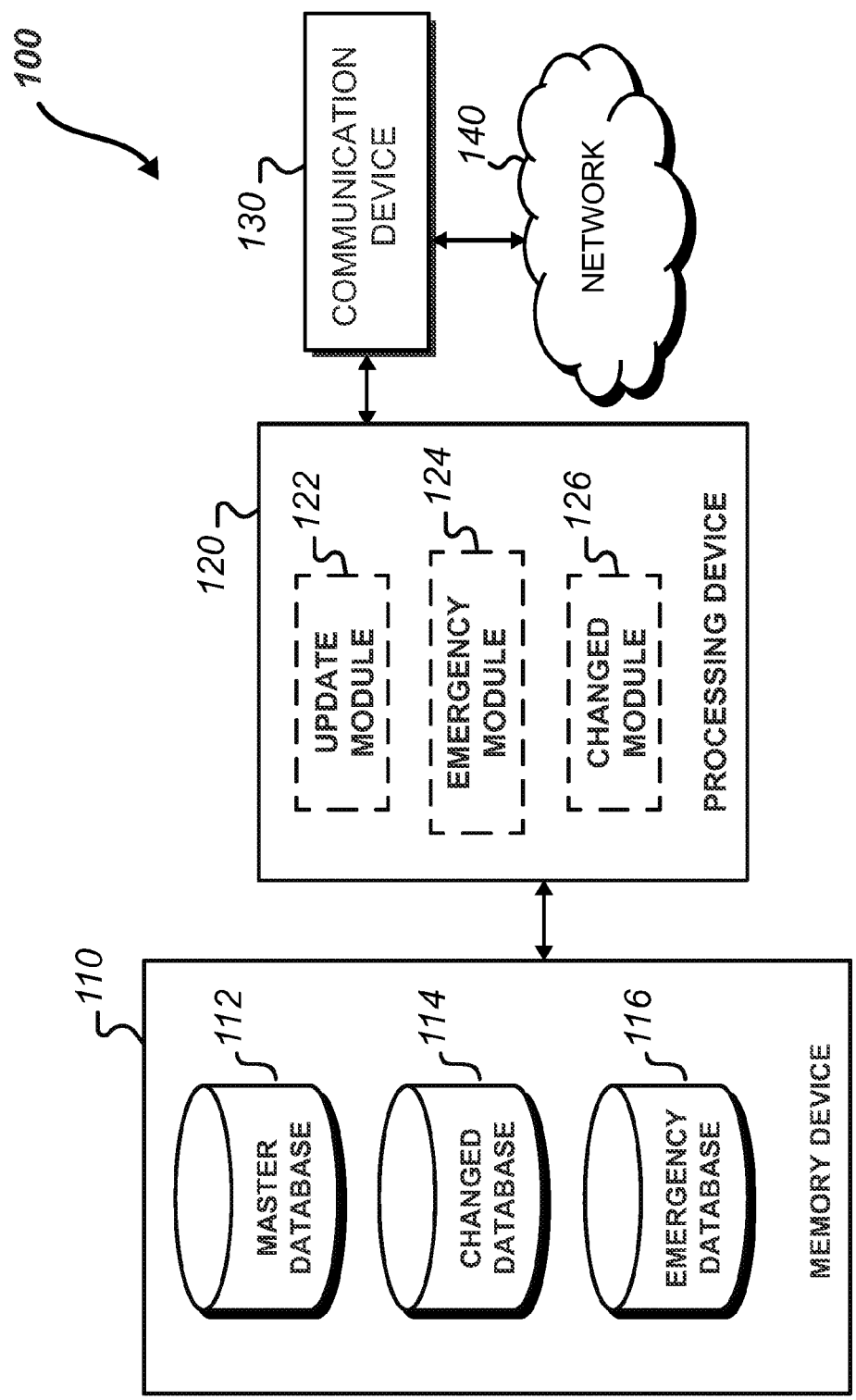
FIG. 1 is a block diagram illustrating components of a database update system according to an embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

The present disclosure is directed to methods, systems, and computer programs for incrementally updating a large key-value store in a production environment. In the following description, reference is made to the accompanying drawings that form a part hereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flowcharts and block diagram in the attached figures illustrate the architecture, functionality, and operation of possible implementations of systems, methods, and computer program products according to various embodiments of the present disclosure. In this regard, each block in the flowcharts or block diagram may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagram block or blocks.

Embodiments of the present disclosure are directed to incrementally updating a large database in a production environment. According to embodiments disclosed herein, database updates may be prioritized according to concerns of the criticality of certain updates and data freshness.

Referring now to FIG. 1, database update system 100 of the present disclosure comprises memory device 110, processing device 120, and communication device 130. Memory device 110 comprises master database 112, changed database 114, and emergency database 116. Processing device 120 comprises update module 122, emergency module 124, and changed module 126. Database update system 100, memory device 110, master database 112, changed database 114, emergency database 116, processing device 120, update module 122, emergency module 124, changed module 126, and/or communication device 130 may refer to one or more servers or other types of computing devices that operate in an individual or distributed manner as will be described in detail below.

In embodiments, master database 112 comprises a large scale key-value data store operated in a production environment. As an example, embodiments of master database 112 comprise up to and more than 100 million key-value entries. In embodiments, entries in master database 112 are sorted in ascending order by the last release date of each entry. Accordingly, an entry that was updated most recently will be last in master database 112.

Master database 112 comprises a time to live ("TTL") mechanism, which defines a data lifetime for entries in master database 112. The TTL mechanism may function to maintain data "freshness" by deleting key-value entries older than a set TTL value. In embodiments, the TTL value comprises a value corresponding to the number of release cycles that data will be allowed to age in master database 112. For example, in a database having a release cycle of one day, a TTL mechanism having a TTL value of 100 may allow an entry to age 100 days after the entry's most recent update before the entry will be marked for deletion. Embodiments of a TTL mechanism further comprise a fault tolerance factor ("FTF"), defined as the number of release cycles an entry in master database 112 will be allowed to age past an unadjusted TTL value before deleting. For example, a TTL mechanism having an unadjusted TTL value of 100 and a FTF value of 5 will allow an entry in master database 112 to age 105 days after its most recent update before the entry will be marked for deletion. The adjusted TTL value in this example is accordingly 105 cycles. In embodiments, master database 112 comprises an update value for each key-value entry to record when the entry was last refreshed. In other embodiments, the TTL mechanism is satisfied by refreshing a predetermined number of oldest entries in master database 112 to attempt to ensure that no entry will age past the TTL value.

In embodiments, changed database 114 comprises a store of key-value entries that have changed but have not been updated in master database 112 yet. In embodiments, entries in changed database 114 are sorted in ascending order by the last release date of each entry. Entries in changed database 114 may comprise entries that carry less priority than those in emergency database 116 and therefore one or more release cycles may pass before the entries in changed database 114 are merged into master database 112.

In embodiments, emergency database 116 comprises a store of key-value entries of high priority for updating in master database 112. Entries in emergency database 116 comprise entries that will be updated in master database 112 in the next release cycle. Entries in emergency database 116 may be entered by human operators and/or computer-implemented modules as such critical updates are identified.

In embodiments, update module 122 is adapted to access memory device 110 and update and/or refresh entries in master database 112. Update module 122 may update master database 112 entries by merging entries from changed database 114 and emergency database 116 into master database 112. Update module 122 can delete selected entries in changed database 114 and emergency database 116 after merging such entries with master database 112. Embodiments of update module 122 comprises operational memory that includes data and/or computer-readable instructions providing for operation of functions described herein. In embodiments, update module 122 is adapted to store and update variables and parameters for master database 112 operations that will be described in further detail.

In embodiments, emergency module 124 is adapted to add entries to emergency database 116 as directed by human operators or other computerized systems. In embodiments, changed module 126 is adapted to add entries to changed database 114.

Communication device 130 is adapted to transmit computer-readable instructions and data over network 140 to other computer systems as directed by processing device 120. As used in the present disclosure, "network" 140 can refer to any communication network including, but not limited to, a wireless network, a cellular network, an intranet, the Internet, or combinations thereof. Communication device 130 can communicate with computing devices used by users to input data and/or receive outputs from system 100. Such user computing devices may comprise personal computers, handheld devices, tablet devices, or other like electronic devices. In embodiments, computing devices store application-specific software installed thereon and adapted to communicate with system 100. In alternative embodiments, operations described herein are effected through web browsers via graphical user interfaces adapted to collect and disseminate information as directed by processing device 120.

Figure 2:
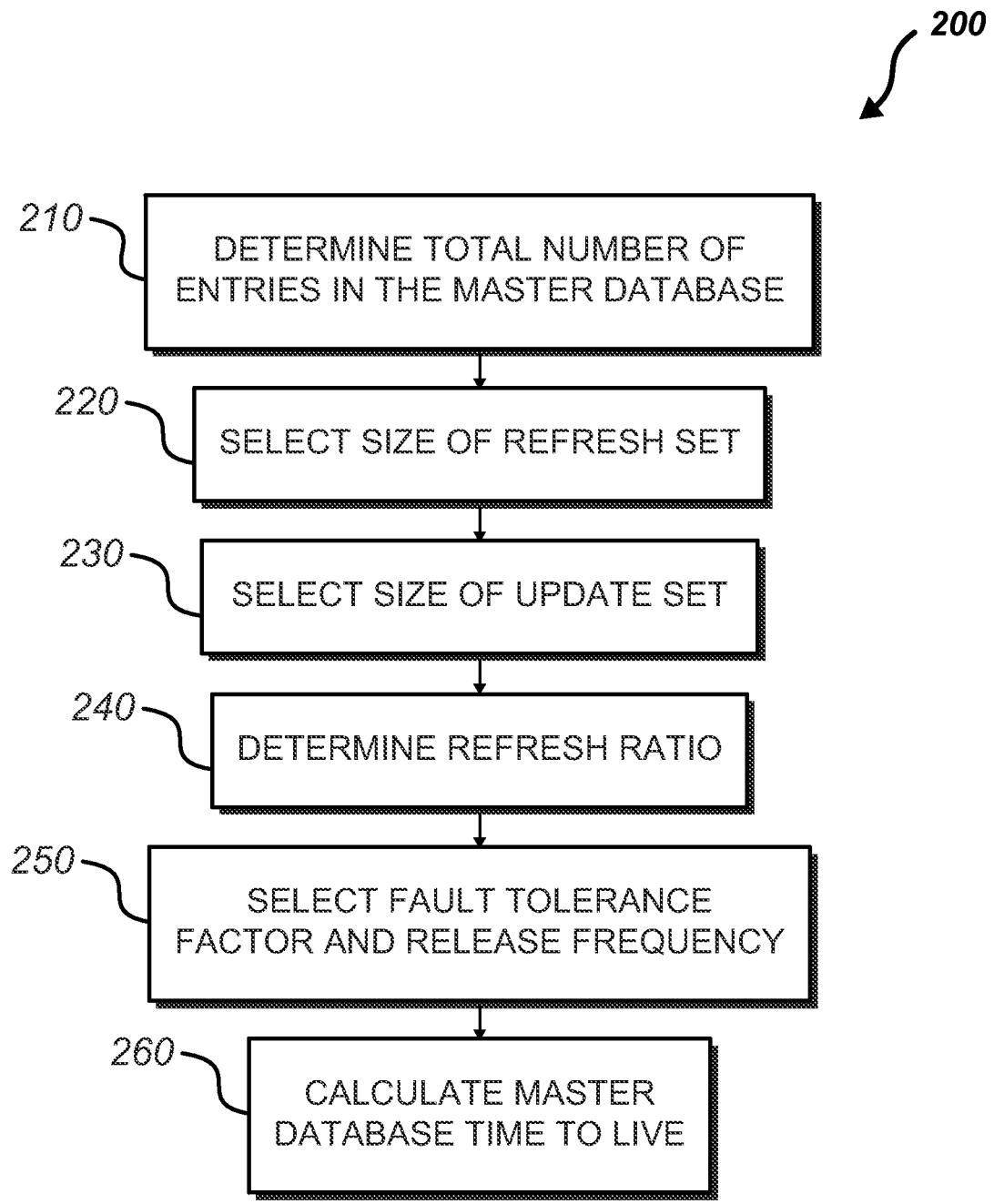
FIG. 2 is a flow chart illustrating an example method for determining a master database time to live value in accordance with embodiments of the present disclosure.

In operation, database update system 100 is adapted to optimize database update and refresh models. Referring now to FIG. 2, a method 200 for determining a TTL value for master database 112 according to embodiments of the present disclosure is illustrated. At operation 210, the total number of entries in master database 112 is counted or approximated. At operation 220, a Refresh Set size is selected. As used herein, "Refresh Set" refers to the set of oldest entries in master database 112 that will be refreshed in the next release cycle. An optimal Refresh Set size may correspond to the size of master database 112 and the speed of transmitting and effecting updates to master database 112. An optimized Refresh Set may refresh enough entries in master database 112 in each release cycle so as to maintain data freshness while minimizing database refresh times. As an example, for a master database 112 having 100 million entries, a Refresh Set may be selectively sized at 1 million entries, thus assuring that every 100 release cycles, all entries in master database 112 will be refreshed at least one time.

At operation 230, an Update Set size is selected. As used herein, "Update Set" refers to the set of all entries that will be refreshed or merged into master database 112 in the next release cycle. An Update Set may be sized according to master database 112 update duration each release cycle. As an example, for a master database 112 comprising approximately 100 million entries, an Update Set size may be set at 2 million entries, meaning that each release cycle, 2 million entries in master database 112 are updated and/or refreshed.

At operation 240, the Refresh Ratio is calculated. As used herein, "Refresh Ratio" refers to the ratio of the Refresh Set size to the Update Set size. In other words, the Refresh Ratio is calculated by dividing the Refresh Set size by the Update Set size. The Refresh Ratio corresponds to the number of old entries that are refreshed each release release cycle to prevent those entries from expiring by the TTL mechanism compared to the total number of entries updated and/or refreshed each release cycle. At operation 250, the FTF value and release frequency are selected. As an example, a FTF value of 5 allows 5 release cycles to pass after an entry's age has surpassed the selected data lifespan for master database 112 before the entry will be marked for deletion. In embodiments of the present disclosure, a release frequency is set at one day. Accordingly, mater database 112 is refreshed and updated every 24 hours.

At operation 260, the TTL value for the master database 112 is calculated by the following formula:

$$TTL = \left(\frac{TE}{US \times RR} + FTF\right) \times RF, \quad (1)$$

wherein:
TTL is the TTL value;
TE is the number of total entries in master database 112;
US is the Update Set size;
RR is the Refresh Ratio;
FTF is the FTF value; and
RF is the release frequency.

In an exemplary embodiment comprising a master database 112 having 100 million entries, an Update Set size set to 2 million entries per release cycle, a refresh ratio of 0.5, a FTF value set to 5, and a release frequency set at one day, the TFT value is calculated to be 105 days. The various factors identified above and the TFT value may be re-selected and recalculated as circumstances change. For example, if master database 112 expands or contracts, the Refresh Set, Update Set, and/or other values may be selectively modified to match the change in master database 112 size. Likewise, if master database 112 update time has become faster or slower, the Refresh Set and/or Update Set may be decreased or increased, respectively, to compensate.

Figure 3:
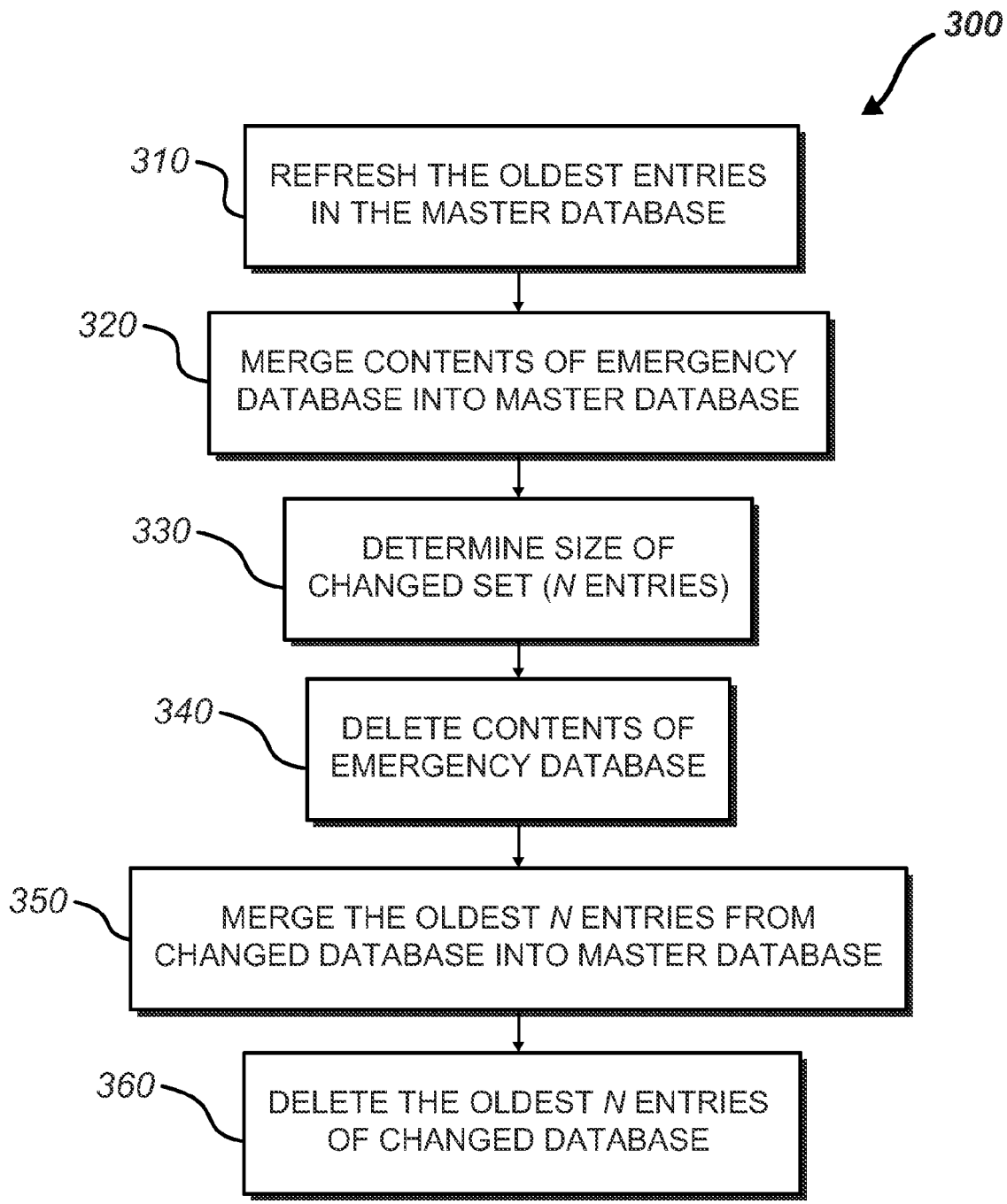
FIG. 3 is a flow chart illustrating an example method for updating a master database in accordance with embodiments of the present disclosure.

Referring now to FIG. 3, a method 300 for updating master database 112 according to embodiments of the present disclosure is illustrated. At operation 310, update module 122 refreshes the oldest entries in master database 112. The number of oldest entries to be refreshed in operation 310 is equal to the Refresh Set size determined in operation 220. Since the entries in master database 112 are sorted in ascending order by the last release date, update module 122 can refresh the top R entries in master database 112, where R is the Refresh Set size, to update the oldest entries. Update module 122 may refresh entries in master database 112 by removing the entries and adding them again to the bottom of master database 112.

At operation 320, update module 122 merges all entries in emergency database 116 into master database 112. Update module 122 may merge emergency database 116 entries into master database 112 by locating matching keys and updating the corresponding values and then moving those updated key-value pairs to the bottom of master database 112. The set of entries merged from the emergency database 116 may be referred to herein as the "Emergency Set."

At operation 330, update module 122 determines the size of Changed Set. As used herein, "Changed Set" refers to the number of entries in changed database 114 that will be modified and/or updated in the next release cycle. The size of Changed Set may be referred to as N entries. The size of the Changed Set may be calculated by the following formula:

$$N = US - (RS + ES), \quad (2)$$

wherein:
N is the Changed Set size;
US is the Update Set size;
RS is the Refresh Set size; and
ES is the Emergency Set size.

In an exemplary embodiment, an Update Set may be set at 2 million entries, a Refresh Set may be set at 1 million entries, and there may be 100 thousand entries in the Emergency Set. Accordingly, the Changed Set size would be calculated to be 900 thousand entries. At operation 340, update module 122 deletes the contents of emergency database 116. At operation 350, update module 122 merges the oldest N entries from changed database 114 into master database 112. The entries from changed database 114 may be inserted at the bottom of master database 112. At operation 360, update module 122 deletes the oldest N entries of changed database 114.

As will be understood by one of ordinary skill in the art having the benefit of this disclosure, embodiments presented herein include a master database 112 update model that refreshes data entries before the data expires at the end of the TTL period, updates all changed entries as soon as feasible, and updates all critical emergency entries before noncritical updates.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed is:

1. A computer-implemented method of updating a master database comprising:
   at the master database comprising a processor, memory, and a key-value data store in a production environment, refreshing a refresh set of oldest entries in the master database, the refresh set of oldest entries comprising:
   a size of the refresh set of oldest entries corresponding to a size of the master database and an update speed of the master database, the update speed based at least in part on a speed to effect updates to the master database;
   determining a time to live value for the master database by:
   dividing the size of the master database by the size of the refresh set of oldest entries; and adding a fault tolerance factor;
by an update module, merging an emergency set of entries in an emergency database into the master database;
in response to merging the emergency set of entries in the emergency database into the master database, deleting, by the update module, the emergency set of entries from the emergency database;
by the update module, merging a changed set of entries in a changed database into the master database; and
in response to merging the changed set of entries in the changed database into the master database, deleting, by the update module, the changed set of entries from the changed database.

2. The method of claim 1, wherein:
the changed set of entries is defined as a size of an update set minus a sum of the size of the refresh set of oldest entries and a size of the emergency set of entries.

3. The method of claim 2, wherein:
the size of the update set is equal to a number of entry updates made to the master database in a release cycle.

4. The method of claim 1, further comprising:
deleting an entry in the master database if the entry has an age greater than the time to live value.

5. The method of claim 1, wherein:
refreshing the refresh set of oldest entries in the master database comprises:
moving the refresh set of oldest entries from a top of the master database to a bottom of the master database.

6. The method of claim 1, wherein:
the fault tolerance factor comprises a number of release cycles that an entry in the master database is allowed to age past an unadjusted time to live, before the entry is deleted.

7. The method of claim 1, wherein:
one or more entries in the changed set of entries comprise a first priority lower than a second priority of one or more entries in the emergency set of entries.

8. The method of claim 7, wherein:
merging the changed set of entries in the changed database into the master database further comprises merging the changed set of entries in the changed database into the master database if the first priority of the one or more entries in the changed set of entries is above a priority limit.

9. The method of claim 1, further comprising:
by the update module, selecting a release frequency.

10. The method of claim 9, wherein:
the release frequency is every 24 hours.

11. The method of claim 1, wherein:
the size of the refresh set of oldest entries is selected such that all entries in the master database are refreshed at least every 100 release cycles.

12. The method of claim 1, wherein:
the size of the refresh set of oldest entries decreases when the update speed decreases.

13. The method of claim 1, further comprising:
deleting an entry in the master database if the entry has an age greater than the time to live value; and
selecting a release frequency;
wherein:
the changed set of entries is defined as a size of an update set minus a sum of the size of the refresh set of oldest entries and a size of the emergency set of entries;
the size of the update set is equal to a number of entry updates made to the master database in a release cycle;
refreshing the refresh set of oldest entries in the master database comprises:
moving the refresh set of oldest entries from a top of the master database to a bottom of the master database;
the fault tolerance factor comprises a number of release cycles that an entry in the master database is allowed to age past an unadjusted time to live, before the entry is deleted;
one or more entries in the changed set of entries comprise a first priority lower than a second priority of one or more entries in the emergency set of entries;
merging the changed set of entries in the changed database into the master database further comprises merging the changed set of entries in the changed database into the master database if the first priority of the one or more entries in the changed set of entries is above a priority limit;
the release frequency is every 24 hours;
the size of the refresh set of oldest entries is selected such that all entries in the master database are refreshed at least every 100 release cycles; and
the size of the refresh set of oldest entries decreases when the update speed decreases.

* * * * *